United States Patent
Torck et al.

[15] 3,666,825
[45] May 30, 1972

[54] PROCESS FOR ALKYLATING AROMATIC HYDROCARBONS

[72] Inventors: Bernard Torck, Chatou; Lucien Sajus, Croissy, both of France

[73] Assignee: Institut Francais Du Petrole, Des Carburants St Lubrifiants, Rueib Malmaison, France

[22] Filed: Dec. 8, 1970

[21] Appl. No.: 96,276

[30] Foreign Application Priority Data

Dec. 11, 1969 France..................................6943079

[52] U.S. Cl......................260/671 R, 260/671 C, 260/671 P
[51] Int. Cl............................................................C07c 3/56
[58] Field of Search........................260/671 R, 671 C, 671 P

[56] References Cited

UNITED STATES PATENTS

| | | | |
|---|---|---|---|
| 3,129,256 | 4/1964 | Hay et al. | 260/671 P |
| 3,132,189 | 5/1964 | Lutz | 260/671 P |
| 3,312,748 | 4/1967 | Johnson | 260/671 |

*Primary Examiner*—Curtis R. Davis
*Attorney*—Millen, Raptes & White

[57] ABSTRACT

Process for alkylating an aromatic hydrocarbon wherein said hydrocarbon is reacted with a member of the group consisting of the olefines and the alkyl halides in the presence of a Lewis acid of the formula $R M X_{n-1}$, in which R is a monovalent organic radical having one – 20 carbon atoms, selected from the group consisting of the alkyl, cycloalkyl, aryl, aralkyl and alkoxy groups, X is a halogen atom or an electronegative group, M is a metal from groups IIIb, IVb and Vb of the periodic classification of the elements and n is the highest valence of the metal, said process comprising using water in a molar proportion of from 0.01 to 5 times that of the Lewis acid.

10 Claims, No Drawings

PROCESS FOR ALKYLATING AROMATIC HYDROCARBONS

This invention relates to a process for alkylating aromatic hydrocarbons by means of an olefine or an alkyl halide, in the presence of a Lewis acid of the formula $RMX_{n-1}$, in which R is an organic monovalent radical having from one to 20 carbon atoms and selected from the alkyl, cycloalkyl, aryl, aralkyl and alkoxy radicals, X is a halogen atom or an electronegative radical, M is a metal selected from groups IIIb, IVb and Vb of the periodic classification and n is the highest valence of the metal M, said process further comprising adding water in a molar amount of from 0.01/1 to 5/1 with respect to the Lewis acid.

Amongst the processes known for alkylating aromatic hydrocarbons, the so-called Friedel and Crafts process comprises reacting aromatic hydrocarbons with alkyl halides, alcohols or olefines in the presence of Friedel-Crafts catalysts such as aluminum chloride, boron trifluoride or other metal halides known as strong Lewis acids. It is already well-known that, in this liquid phase reaction, the active catalyst is not the solid metal halide but a complex mixture of the metal halide with a protonic acid and hydrocarbons, for example the partially alkylated hydrocarbons. This mixture is commonly known as catalyst complex. It appears as a brown heavy oil and its composition may vary according to the particular reactant. The insolubility of this catalyst complex in the hydrocarbons to be alkylated is responsible for some difficulties in the continuous operation of industrial plants. Another main disadvantage is the insufficient stability of this catalyst complex whose composition and catalytic activity may vary as a function of time. In order to obtain a constant production, the activity level of the catalyst complex must be adjusted continuously by injecting, together with the feed charge, cocatalysts such as organic halides or protonic acids and the metal halide. This reactivation treatment is somewhat empirical since the activity of this catalyst complex cannot be controlled easily. Another disadvantage, derived from the latter, is the rather high catalyst consumption with respect to the produced alkylate.

Dihaloalkylaluminums are also known as catalysts for alkylating aromatic hydrocarbons with olefines; however their catalytic activity is less than that of aluminum chloride.

This invention is based on the discovery of a surprising effect of water on the catalytic activity of the alkyl metal compounds, particularly the alkylaluminum dihalides, when used in a process for alkylating aromatic hydrocarbons by means of olefinic hydrocarbons or alkyl halides. It is known that the proton-donors and particularly water have a co-catalytic effect on the Lewis acids of the $MX_n$ type, wherein M is a metal atom of valence n and X is a halogen atom or an electronegative group.

However it could not be expected that water would have the same effect on the alkyl metal compounds and particularly the alkylaluminum dihalides since water is known to destructively hydrolyze the alkylmetal halides: it is well known that alcohols and water may be used to deactivate catalysts based on alkyl metals and particularly alkyl aluminums at the end of such reactions as polymerization. For the same reason, a great care must be taken to avoid admixing oxygen or oxygen compounds with organoaluminum compounds.

It is quite unobvious that the use of a small critical amount of water results in a substantial increase of the activity of the alkylaluminum compounds, particularly the alkylaluminum halides. The resulting catalysts may be used to alkylate the aromatic compounds at reaction rates much higher than those achieved with the use of aluminum chloride and consequently of alkyl aluminum dihalides, since, as shown hereinbefore, the catalytic activity of these dihalides is lower than that of aluminum chloride. The yield of alkylate per mole of alkyl metal compound is substantially higher than that obtained with aluminum chloride. The di-haloalkylaluminum compounds for example, are soluble in the hydrocarbons to be alkylated and this results in the disappearance of a number of the disadvantages resulting from the use of aluminum chloride. The catalytic activity of the solutions may be easily controlled. Finally, by adjusting the catalyst concentration, there are obtained solutions which can be used for the selective alkylation of an olefine contained in a mixture of olefines of various reactivity.

This invention is thus concerned with a process for alkylating an aromatic hydrocarbon by means of an olefinic hydrocarbon or an alkyl halide, in the presence of a soluble catalyst manufactured from a Lewis acid of the formula $RMX_{n-1}$ and water used in a molar amount of water to the Lewis acid of from 0.01/1 to 5/1 and preferably from 0.1/1 to 2.5/1. In this formula, R is a monovalent organic radical having one–20 carbon atoms, selected from the alkyl, cycloalkyl, aryl, aralkyl and alkoxy groups or the halides thereof, methyl, ethyl, propyl and butyl being preferred. X is a halogen atom or an alectronegative group, preferably chlorine, M is a metal atom from group IIIb, IVb or Vb of the periodic classification, preferably aluminum, and n is the highest valence of the metal atom.

In many cases it may be advantageous to add a cocatalyst which may be a proton-donor of the formula AH in which A is an acid anion, preferably an anion of a strong inorganic or organic acid, for example a hydrogen halide, a fatty acid, a halogenated fatty acid, or an alkoxy group having, for example, from one to 20 carbon atoms (for example ethoxy or phenoxy). The cocatalyst may also be a halide of a monovalent hydrocarbon radical such as R as hereabove defined or a metal halide or a mixture of these cocatalysts. From $10^{-6}$ to 1 mole, and preferably from $10^{-5}$ to 0.1 mole, of cocatalyst may be used for one mole of aromatic hydrocarbon.

As examples of Lewis acids to be used in this invention, there will be mentioned dichloroethylaluminum, dichlorohexyl-aluminum, trichloro o-tolyl tin, tricholorobenzyl lead, tetrachlorophenyl antimony, ethoxy dichloro aluminum and cyclohexyl dibromoaluminum. Sulfuric acid, hydrochloric acid, hydrobromic acid, trichloracetic acid, trifluoracetic acid acetic acid, benzene sulfonic acid and ethanol are examples of cocatalysts.

This process for alkylating an aromatic hydrocarbon with, for example, an olefinic hydrocarbon, in liquid phase, may be carried out at a temperature of from $-10°$ to $120°$ C. and preferably from $10°$ to $70°$ C. at a pressure of 0.1 to 200 atmospheres and preferably 0.5 to 5 atmospheres. From $10^{-6}$ to 1 mole and preferably from $10^{-5}$ to 0.1 mole of Lewis acid may be used per mole of aromatic hydrocarbon.

It has been found advantageous to contact water with the Lewis acid at moderate conditions (low temperature and low concentration) to avoid too strong a reaction which would destroy the catalyst. After filtration, the resulting homogeneous solutions are stable and may be admixed with reactants to alkylate aromatic hydrocarbons with olefinic hydrocarbons.

These catalysts may be used to selectively hydrogenate an aromatic hydrocarbon with an olefine present in a mixture of olefines, provided there is a significant difference of reactivity between said olefine and the other olefinic of the mixture. When using an olefines mixture, it is sometimes better to initiate the reaction with the olefine to be alkylated.

Oxygen is to be avoided since its presence results in the deactivation of the catalyst.

The process may be applied to the alkylatable aromatic hydrocarbons, i.e. to hydrocarbons having for example from six to 30 carbon atoms, and preferably from six to 14 carbon atoms, with at least one benzene ring of six carbon atoms. These hydrocarbons may have from one to six benzene rings, either condensed or not, or even linked by hydrocarbon chains having each, for example, from one to 10 carbon atoms. The aromatic rings may be either unsubstituted or substituted with various substituents, preferably hydrocarbon substituents. The preferred aromatic hydrocarbons have from one to three benzene rings and from 0 to 4 saturated hydrocarbon substituents.

The following aromatic hydrocarbons are mentioned by way of example: benzene, toluene, xylenes, ethylbenzene, cumene, pseudoncumene, tetrahydronaphthalene, naphthalene, 1-methyl naphthalene, 1,8-diethyl naphthalene, biphenyl, 2,4,6-tributyl biphenyl, the diphenylalkanes in which the aromatic rings are connected through a saturated aliphatic chain, such as, for example, diphenylmethane, 1,3-diphenyl butane, 2,2-diphenyl propane, anthracene and its substitution derivatives and phenanthrene and its substitution derivatives.

The olefine which may be used as alkylating agent is a mono-olefinic hydrocarbon of two–20 carbon atoms per molecule. It may be acyclic or cyclic and have an internal or terminal double bond. For example, the following olefines may be used : ethylene, propylene, 1-butene, 2-butenes, isobutylene, 1-pentene, iso-amylene, 1-octene, 2,4,4-trimethyl-1-pentene, decenes, dodecenes, propylene tetramers, or mixtures of olefines such as the olefines obtained by cracking paraffin waxes or the olefines obtained by catalytic dehydrogenation of paraffins.

Cyclohexene, cyclopentene, cyclooctene and cyclododecene are examples of cyclic olefines. The olefine may contain inert compounds as diluents, particularly saturated hydrocarbons such as methane, ethane, propane, or any other saturated hydrocarbon.

The aromatic hydrocarbon may be dissolved in an inert solvent such as hexane, iso-octane, cyclohexane or decahydronaphthalene, particularly when said hydrocarbon is not liquid at room temperature.

The following examples are given for illustrative purposes only :

EXAMPLE 1

A reaction vessel is made free of air and moisture and then maintained under an atmosphere of propylene previously dried with a molecular sieve. Then, at 10° C. 100 ml of benzene, dehydrated by passage through a molecular sieve bed and saturated with dry propylene, and 0.5 ml of a solution containing 25 percent by weight of dichloroethylaluminum in a mixture of hexane and benzene (a total of 0.8 millimole of dichloroethylaluminum) are introduced therein. After stirring of the mixture, no propylene absorption is to be observed. The analysis of the liquid phase by mass spectrometry shows the absence of iso-propyl benzene formation.

EXAMPLE 2

50 ml of benzene containing 490 ppm of water and 0.25 ml of a solution of dichloroethylaluminum, containing 25 percent by weight of the latter, in a mixture hexane-benzene, are added to the solution of the preceding example. The molar ratio of water to dichloroethylaluminum is 1. The solution immediately turns to orange yellow and propylene under atmospheric pressure is absorbed. After one hour, stirring is discontinued and the resulting products are analyzed by mass spectrometry and gas-liquid chromatography. The product has the following composition (percent by weight) :

| | |
|---|---|
| benzene | 47 |
| cumene | 20 |
| di-iso-propyl benzene | 9 |
| tri-iso-propyl benzene | 17 |
| tetra-iso-propyl benzene | 7 |

EXAMPLES 3 to 14

200 ml of benzene containing different water amounts, 15 g of 1-pentene and 1 ml of a 50 percent by weight solution of dichloroethylaluminum in hexane (i.e. 3.4 millimoles of dichloroethylaluminum) are introduced at 15° C. into a reaction vessel previously made free of air and water vapor. 80 g of 1-pentene are introduced stepwise as the olefine is consumed, the temperature being maintained at 15° C. The reaction product is analyzed by mass spectrometry. The results are given herebelow :

| Example number | Amount of water, mg. | Molar ratio water/Lewis acid | Reaction time, mn. | Benzene | Monoisopentyl benzene | Di-isopentyl benzene | Tri-isopentyl benzene | Tetra-isopentyl benzene |
|---|---|---|---|---|---|---|---|---|
| 3 | 0 | 0 | 300 | 100 | 0 | 0 | 0 | 0 |
| 4 | 0.06 | 0.001 | 300 | 95 | 2 | 1 | 1 | 1 |
| 5 | 0.12 | 0.005 | 300 | 95 | 2 | 1 | 1 | 1 |
| 6 | 0.6 | 0.01 | 250 | 90 | 3 | 3 | 2 | 2 |
| 7 | 3 | 0.049 | 160 | 70 | 12 | 8 | 7 | 3 |
| 8 | 9 | 0.15 | 120 | 62 | 11.5 | 11.7 | 12.0 | 2.8 |
| 9 | 50 | 0.82 | 75 | 55 | 11 | 13 | 12.6 | 8.4 |
| 10 | 75 | 1.24 | 12 | 43 | 29 | 12.5 | 13 | 2.5 |
| 11 | 100 | 1.60 | 15 | 60.5 | 20 | 7.8 | 9.7 | 2 |
| 12 | 156 | 2.50 | 12 | 65 | 18 | 6.2 | 5.8 | 5 |
| 13 | 312 | 5 | 75 | 90 | 5 | 3 | 1 | 1 |
| 14 | 470 | 7.5 | 120 | 100 | 0 | 0 | 0 | 0 |

This table shows the advantage of using critical amounts of water according to the process of this invention.

EXAMPLES 15 TO 20

Example 2 is repeated with the following alkyl aluminum dihalides :

EXAMPLE 15 : dichloromethylaluminum
EXAMPLE 16 : dichloropropylaluminum
EXAMPLE 17 : dibromo butylaluminum
EXAMPLE 18 : dichloro hexylaluminum
EXAMPLE 19 : ethoxy dichloroaluminum
EXAMPLE 20 : cyclohexyldibromoaluminum The molar ratio of the water to the alkylaluminum dihalide is 1.

The results are substantially the same as those of example 2.

EXAMPLE 21

A glass reaction vessel is made free from air and moisture and thereafter maintained under an atmosphere of propylene previously dried with a molecular sieve. 20 ml of benzene having a 75 ppm water content and 1 ml of a solution of HCl in benzene are introduced, at 40° C. into said reaction vessel. The resulting solution is saturated with propylene under atmospheric pressure and 0.1 ml of a 50 percent by weight solution of dichloroethyl aluminum in hexane is added thereto. The molar ratio of HCl to dichloroethyl aluminum is 0.5 : 1. As soon as this addition is effected, the solution is colored to orange-yellow and the propylene is absorbed at atmospheric pressure. After 10 minutes 23 g of propylene are thus absorbed. After 18 minutes the products obtained are analyzed by gas-liquid chromatography. The produced mixture has the following composition :

| | % by weight |
|---|---|
| Benzene | 2.5 |
| Cumene | 4.2 |
| diisopropylbenzene | 11.2 |
| triisopropylbenzene | 51.1 |
| tetraisopropylbenzene | 31.0 |

EXAMPLE 22

Example 21 is repeated, except that HCl is replaced with iso-propyl chloride and that benzene contains only 45 ppm of water. After 40 minutes of reaction, the mixture is analyzed as follows :

| | % by weight |
|---|---|
| Benzene | 32.1 |
| Cumene | 24.3 |
| diisopropylbenzene | 19.0 |
| triisopropylbenzene | 15.9 |
| tetraisopropylbenzene | 8.7 |

EXAMPLE 23

20 ml of meta-xylene containing 290 parts by weight of water per million of parts of meta-xylene are introduced into a glass reaction vessel free of air and water and containing an atmosphere of propylene dried on molecular sieve. Propylene is supplied under atmospheric pressure to saturate the solution, and 0.1 ml of a 50 percent b.w. solution of dichloroethylaluminum in hexane is added thereto. 8.5 g of propylene are absorbed in about 10 minutes. The reaction mixture contains meta-xylene, dimethyl-isopropyl-benzene and dimethyl-di-isopropyl benzene.

What we claim as our invention is:

1. In a process for alkylating an aromatic hydrocarbon wherein said hydrocarbon is reacted with a member of the group consisting of the olefines and the alkyl halides, the improvement comprising conducting the process in the presence of a catalytic reaction product of water and a Lewis acid of the formula $RMX_{n-1}$ in which R is a monovalent organic radical having one–20 carbon atoms, selected from the group consisting of the alkyl, cycloalkyl, aryl, aralkyl and alkoxy groups, X is a halogen atom or an electronegative group, M is a metal from groups IIIB, IVb and Vb of the periodic classification of the elements and n is the highest valence of the metal, said water being used in a molar proportion of from 0.01 to 5 times that of the Lewis acid.

2. The process of claim 1, wherein the molar ratio of water to the Lewis acid ranges from 0.1 to 2.5.

3. The process of claim 1, wherein the metal M is aluminum.

4. The process of claim 1, wherein the radical R is a halogen-containing radical.

5. The process of claim 1, wherein the radical R is selected from the group consisting of methyl, ethyl, propyl and butyl.

6. The process of claim 1, wherein X is chlorine or bromine.

7. The process of claim 1, wherein a proton donor is present.

8. The process of claim 7, wherein the proton donor is of the formula AH in which A is an acid anion or an alkoxy group.

9. The process of claim 1, wherein the temperature is from $-10°$ to $+120°$ C. and the pressure from 0.1 to 200 atmospheres.

10. The process of claim 1, wherein the Lewis acid is used in a proportion of $10^{-6}$ to 1 mole per mole of aromatic hydrocarbons.

* * * * *